(12) United States Patent
Martinez

(10) Patent No.: US 7,419,136 B2
(45) Date of Patent: Sep. 2, 2008

(54) CABLE PULLING DEVICE

(76) Inventor: Chris Martinez, 2849 Jordan Way, Pinole, CA (US) 94564

( * ) Notice: Subject to any disclaimer, the term of this patent is extended or adjusted under 35 U.S.C. 154(b) by 149 days.

(21) Appl. No.: 11/322,743

(22) Filed: Dec. 30, 2005

(65) Prior Publication Data

US 2007/0170408 A1 Jul. 26, 2007

(51) Int. Cl.
H02G 1/08 (2006.01)
(52) U.S. Cl. .............. 254/134.3 FT; 254/390; 174/50; 174/60
(58) Field of Classification Search ......... 254/388–417, 254/134.3 R, 134.3 FT, 134.3 PA; 174/49, 174/50, 60
See application file for complete search history.

(56) References Cited

U.S. PATENT DOCUMENTS

| | | | | |
|---|---|---|---|---|
| 3,944,184 A | * | 3/1976 | Fisch | 254/134.3 R |
| 4,358,089 A | * | 11/1982 | Metcalf | 254/415 |
| 4,541,615 A | * | 9/1985 | King, Jr. | 254/134.3 FT |
| 4,574,789 A | * | 3/1986 | Forster | 602/32 |
| 4,600,176 A | * | 7/1986 | Ludwigs | 254/134.3 FT |
| 4,830,340 A | * | 5/1989 | Knitig | 254/391 |
| 5,029,817 A | | 7/1991 | Tamm | 254/134.3 R |
| 5,236,177 A | * | 8/1993 | Tamm | 254/134.3 FT |
| 5,295,733 A | * | 3/1994 | LeBegue | 299/30 |
| 5,538,224 A | * | 7/1996 | Powell et al. | 254/406 |
| 6,651,962 B2 | * | 11/2003 | Habberstad | 254/406 |
| 2007/0044985 A1 | | 3/2007 | Tideback | |

OTHER PUBLICATIONS

O-Z/Gedney, Mogul Conduit Bodies Catalog, 4 pages, downloaded Dec. 30, 2005 (copyright 2005).
Appleton, Conduit Fitting Catalog, 8 pages, downloaded Dec. 30, 2005 (copyright 2005).

* cited by examiner

Primary Examiner—Emmanuel M Marcelo
(74) Attorney, Agent, or Firm—David D. Eaton

(57) ABSTRACT

A cable is moved through a cable fitting (for example, a BUB fitting) into a first opening of the fitting and out of a second opening of the fitting. A roller support structure is mounted on a fitting such that a set of rollers supported by the roller support structure is disposed inside the interior volume of the fitting. A spacer is disposed between the roller support structure and the fitting. An end of a cable is then moved into a first opening of the filling, over the rollers, and out of the fitting through the second opening. Once the cable has rolled over the rollers a desired distance though the fitting, the spacer is removed and the rollers are detached from the roller support structure. The rollers are slipped out around the cable and extracted from the interior volume. The roller support structure is then unmounted from the fitting.

24 Claims, 13 Drawing Sheets

CABLE PULLING DEVICE

BACKGROUND INFORMATION

FIG. 1 shows a cable fitting 8 (sometimes referred to as a conduit fitting) which is comprised of a first opening 25, a second opening 26, cover plate retaining holes 21-24 and an interior volume 27 that is disposed between the first opening 25 and the second opening 26. The cable fitting is designed such that a cable can occupy the interior volume 27. The cable fitting also includes cover plate retaining holes 21-24 that permit the mounting of a cover plate to the cover plate plane of the cable fitting 8 once a cable has been installed into the fitting.

FIG. 2 is a diagram describing how a cable 20 is moved through two cable fittings, a first cable fitting 17 and a second cable fitting 18. The cable 20 in this diagram is a three conductor 500 MCM electrical cable which is approximately three inches in diameter, heavy and difficult to maneuver. The cable 20 will be pulled from the cable tray 13, through first cable fitting 17 and then through second cable fitting 18. Conduit 9 is protective tubing which the cable 20 is also pulled through and is located between the cable tray 13 and then connected to the first opening 25 of first cable fitting 17, between the second opening 26 of first cable fitting 17 and first opening of second cable fitting 18. Additional conduit is also attached to the second opening 26 of second cable fitting 18 and extends beyond the second cable fitting 18. In this diagram the first cable fitting 17 is separated from second cable fitting 18 by approximately four-hundred feet. Installation of the cable 20 through first cable fitting 17 and out of second cable fitting 18 requires two cable pulls. The first pull involves pulling enough cable 20 to reach the second cable fitting 18, over four-hundred feet in length, from cable tray 13, through conduit 9, and through the first opening 25 of first cable fitting 17. Three pulling wheels with anchor plates 10-12, a pulling wheel 15 and a tugging machine 16 are used to pull the cable 20 through first cable fitting 17 in the direction of the first pull. Pulling wheel 15 is attached to the bumper of a stationary truck. The pulling wheels with anchor plates 10-12 are anchored into concrete. Tugging machine 16 pulls the cable 20 from the first opening of first cable fitting 17 in the direction of the first pull around pulling wheel 10, then around pulling wheel 15 to pulling wheel 11 and then around pulling wheel 12.

Once the first pull has been completed, the entire length of cable is available to be hand fed back into the second opening 26 of the first cable fitting 17. In order to complete the first pull, anchor locations are necessary for the three pulling wheels with anchor plates 10-12 and pulling wheel 15 anchored to the truck bumper. The entire length of cable is exposed during the first pull and may have to be laid adjacent a roadway and marked with warning tape or cones. Additionally, damage from contact with automobile traffic is possible when the cable is exposed in this manner. To arrange the pulling wheels with anchor plates 10-12, the tugging machine 16, pulling wheel 15 and to handle the heavy cable and feed it back into the first cable fitting 17 requires, approximately, a team of eight persons working one eight hour day.

Once the first pull is completed, a second pull is necessary to pull the cable 20 through the second opening 26 of the first cable fitting 17 through conduit and through the first opening of cable fitting 18. The cable fitting is pulled in the direction of the second pull through the first opening in the second cable fitting 18 by pulling motor 19.

Because pulling the cable through fittings as described is labor intensive, of significant duration and exposes the electrically conducting cable 20 to hazards, another method is desirable to reduce the amount of labor and time required to install cable through cable fittings and one that reduces the possibility of damage to the cable.

SUMMARY

A cable (for example, a large diameter electrical cable) is moved through a cable fitting (for example, a Crouse Hinds four inch BUB fitting) into a first opening of the fitting and out of a second opening of the fitting. This avoids having to pull the entire length of cable out of the fitting through the cover plate opening of the fitting, and then having to feed the end of the cable back into the cover plate opening and through the second opening in a second pull to complete threading the cable through the fitting. Two cable pulls are avoided. Only a single pull is necessary.

A novel roller support structure is mounted on a cable fitting such that a set of rollers supported by the roller support structure is disposed inside the interior volume of the cable fitting. Spacers are disposed between the roller support structure and the fitting so that the rollers are disposed a distance off the inside bottom surface of the cable fitting. An end of a cable is then moved into a first opening of the fitting, over the rollers, and out of the fitting through the second opening. Once the cable has rolled over the rollers a desired distance though the fitting, the spacers are removed. Removing the spacers allows the roller support structure to drop down toward the inside bottom surface of the cable fitting. This provides a separation between the tops of the rollers and the bottom of the cable. The rollers can then be lifted up and out of retaining J-shaped channels in the roller support structure. In this fashion, the rollers are detached from the roller support structure. The rollers are then slipped out around the cable (between the cable and the interior sidewalls of the cable fitting) and are extracted from the interior volume. The roller support structure is then unmounted from the fitting. The cover plate is attached to the cable fitting, thereby completing installation of the cable. Only one cable pull is involved.

The roller support structure may involve a frame, to which a first removable side plate and a second removable side plate are attached. A first end of each roller is supported by the first side plate, whereas a second end of each roller is supported by the second side plate. The rollers can be detached from the roller support structure after cable installation by detaching one of the side plates from the frame. The side plates can then be flared with respect to one another such that the bottom edges of the side plates are moved apart. This flaring allows the rollers to fall out of supporting holes or grooves in the side plates. Once the rollers are released from the side plates, the rollers can be extracted from underneath the cable and can be removed from the fitting.

In another embodiment, rather than a roller support structure that involves a machined frame and separate side plates, the roller support structure may be of unitary construction. The roller support structure may, for example, be a single piece of cast aluminum with removable rollers. Making the roller support structure of a single cast piece reduced cost associated with manufacturing and the roller support structure.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings. An embodiment in accordance with one novel aspect of the invention is shown by FIGS. 3-6 and FIGS. 8-11.

Figure 3:
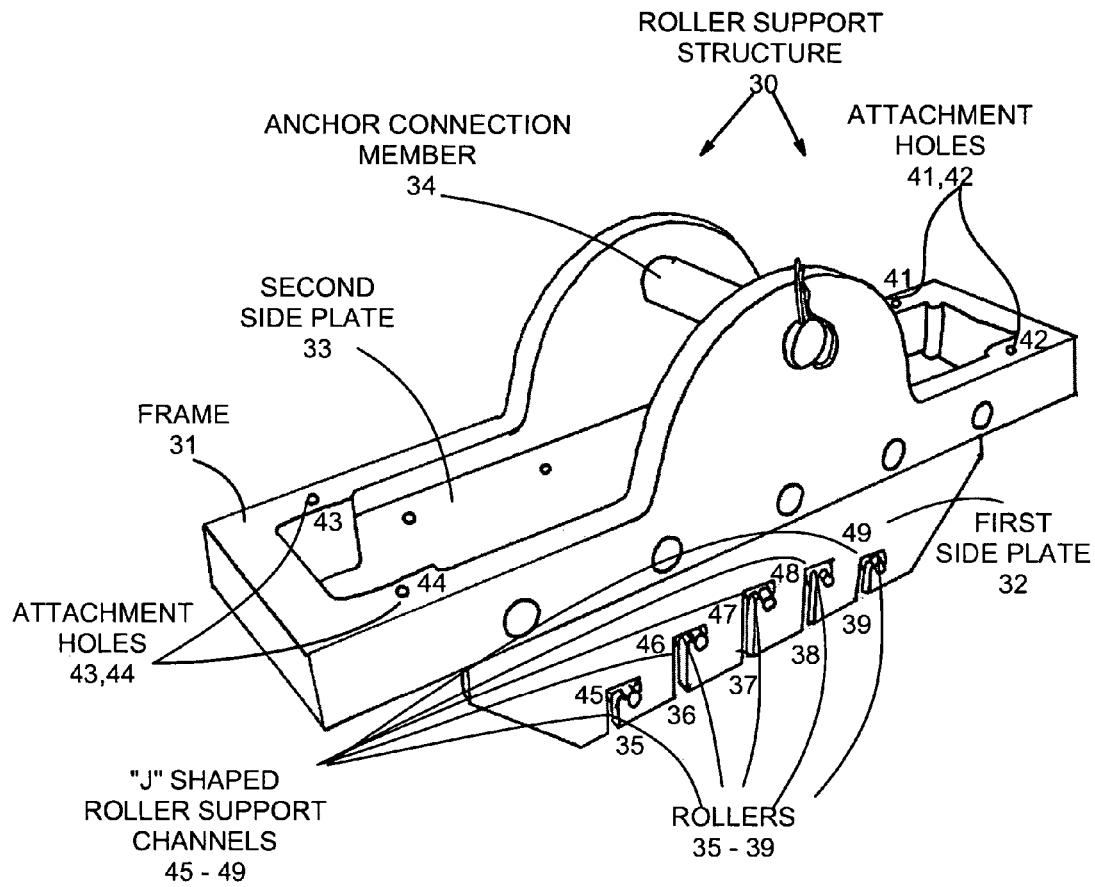
FIG. 3 shows a roller support structure.

FIG. 3 shows a roller support structure 30 which comprises a frame 31, a first side plate 32, a second side plate 33, and anchor connection member 34. The roller support structure additionally comprises rollers 35-39. The rollers 35-39 are disposed axially between first side plate 32 and the second side plate 33 and are connected to each side plate by an axle 70 of FIG. 6 which extends through each of the rollers 35-39. First side plate 32 and second side plate 33 each contain five "J" shaped channels 45-49. These "J" shaped channels can either be completely through side plates 32 and 33 or partially through side plates 32 and 33 leaving the outside of side plates 32 and 33 smooth. If the "J" shaped channel is only partially through each side plate 32 and 33, the axles 70 of rollers 35-39 would not be able to slip out of "J" shaped channels 45-49. Each of the "J" shaped channels 45-49 permits one of rollers 35-39 to be connected between first side plate 32 and second side plate 33. Each of the "J" shaped channels 45-49 also permits one of rollers 35-39 to be disconnected between first side plate 32 and second side plate 33. The anchor connection member 34 extends from one side of frame 31 to the opposite side of frame 31 and is removable from frame 31. Anchor connection member 34 permits the roller support structure to be connected to an anchor when cable is being moved through the cable fitting. Pulling a large diameter cable may involve pulling tensions of thousands of pounds. This force pulls the rollers down and thereby forces the roller support structure down against the cable fitting with considerable force. This force may be so great that it crushes or damages the cable fitting or conduits to which the cable fitting is attached. Connecting the anchor connection member 34 to an anchor (for example, a heavy vehicle or structural beam) allows some or all of this force to be absorbed by the anchor, thereby preventing the force from being transferred to the cable fitting and causing potential damage.

Figure 1:
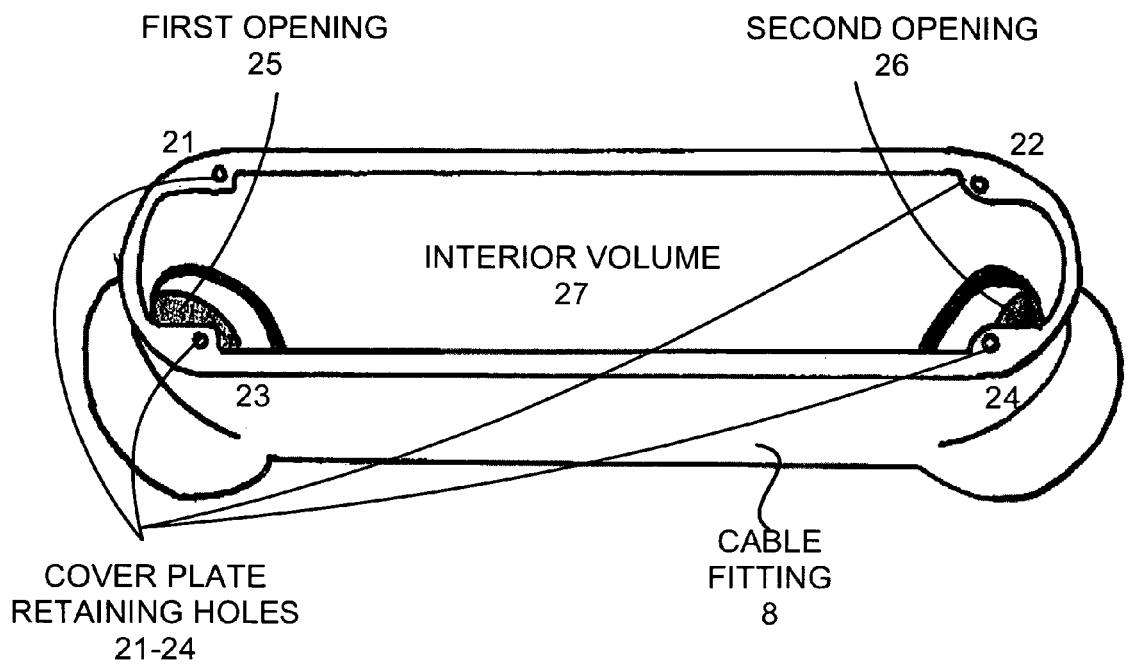
FIG. 1 is a drawing of a cable fitting.
Figure 2:
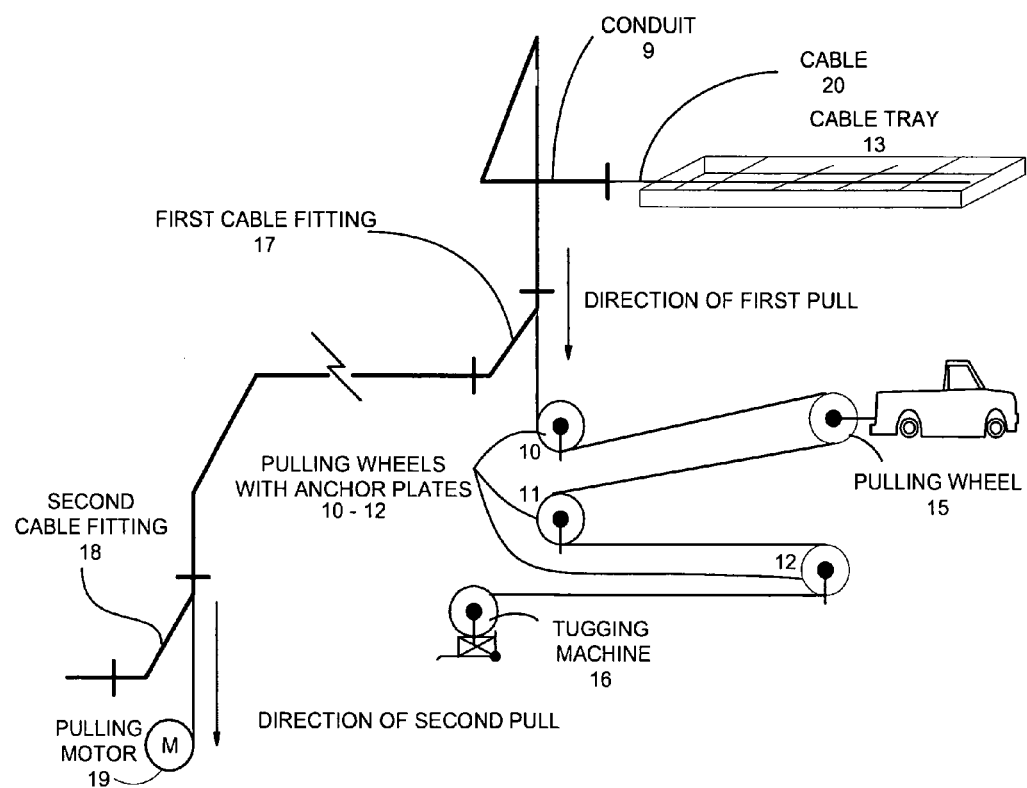
FIG. 2 is a diagram showing wire being pulled through a cable fitting without the use of the invention.

Also shown in FIG. 3 are attachment holes 41-44. Attachment holes 41-43 are disposed on the top surface of the frame 31 of the roller support structure 30 and extend through the frame to the planar bearing surface of the roller support structure. The attachment holes are for mounting and unmounting the roller support structure 30 to the cable fitting 8 of FIG. 1.

Figure 4:
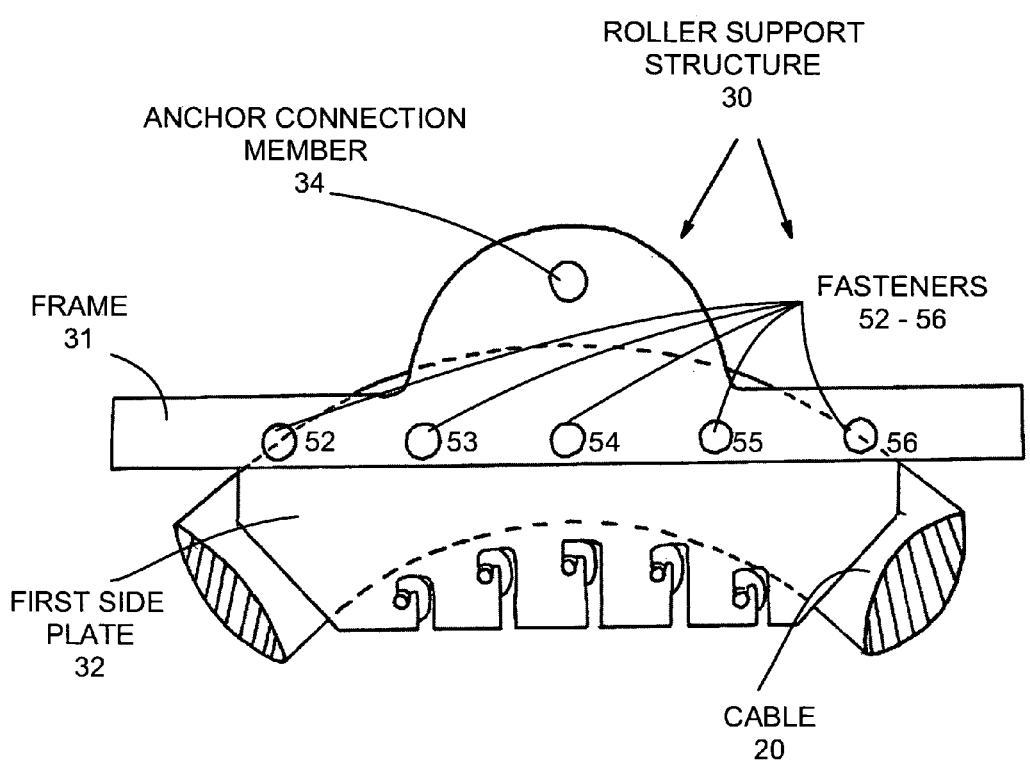
FIG. 4 is a side view of a roller support structure.

FIG. 4 is a side view of roller support structure 30 and illustrates fasteners 52-56 which are placed along the frame 31 of the roller support structure and are used to connect the side plate 32 to the frame 31. Fasteners 52-56 allow removal of first side plate 32 in case of failure of the fitting or to facilitate unmounting of the roller support structure 30 from a cable fitting 8. Second side plate 33 is also connected to the roller support structure in the same manner. This figure also contains an illustration of the cable 20 disposed between the first side plate 32 and second side plate 33 and above rollers 35-39 of FIG. 3.

Figure 5:
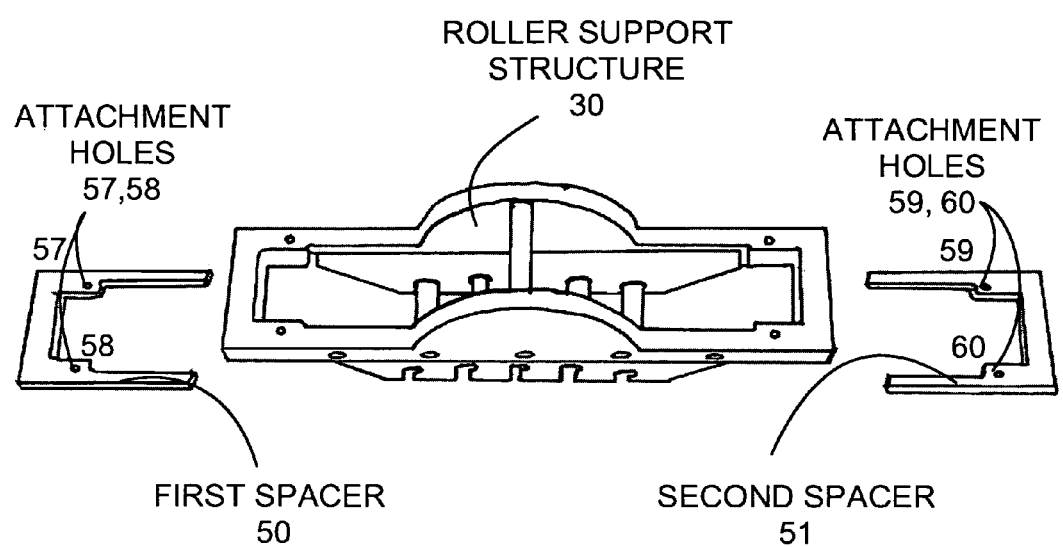
FIG. 5 is a view of a roller support structure and spacers.

FIG. 5 is a view of roller support structure 30, a first spacer 50 and a second spacer 51. The first spacer 50 contains two attachment holes 57, 58 that extend through the top plane of the first spacer 50 through first spacer 50 to the bottom surface plane of the first spacer 50. The second spacer 51 contains two attachment holes 59, 60 that extend through the top plane of the second spacer 51 through the second spacer 51 to the bottom surface plane of the second spacer 51. All interior edges of roller support structure 30, first spacer 50, and second spacer 51 are smooth to prevent damage to the insulation of cable 20 during installation of cable into a fitting.

Figure 6:
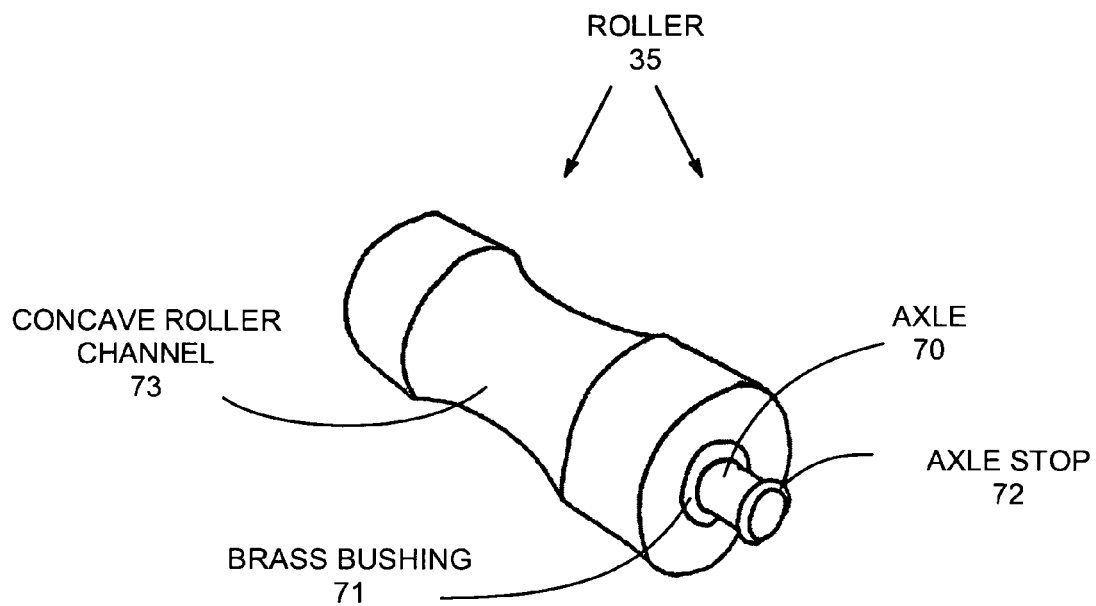
FIG. 6 is a view of a roller.

FIG. 6 is a detailed diagram of roller 35. The roller 35 comprises a concave roller channel 73, axle 70 which extends through the length of the roller. A brass roller bushing 71 is placed around the axle 70 of roller 35 to allow the roller to spin about the axle. Axle stop 72 is present on each end of the axle to prevent the axle from slipping out of the side plate.

Figure 8:
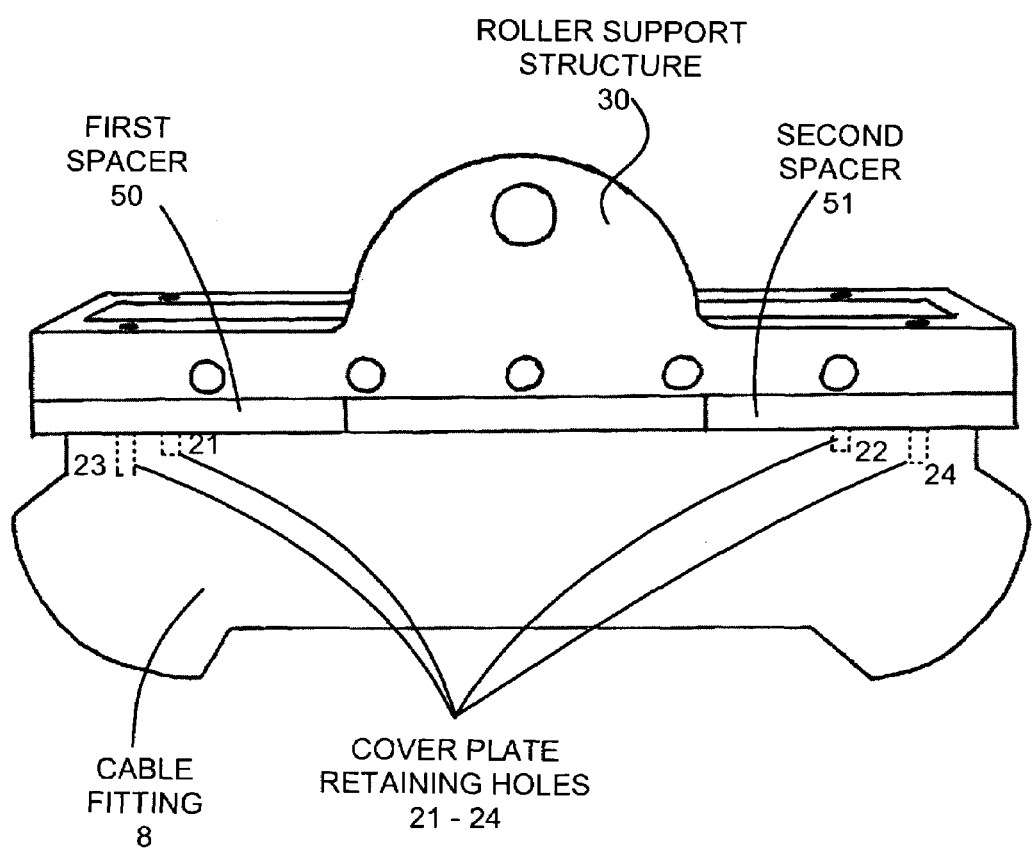
FIG. 8 shows a roller support device attached to a cable fitting.
Figure 9:
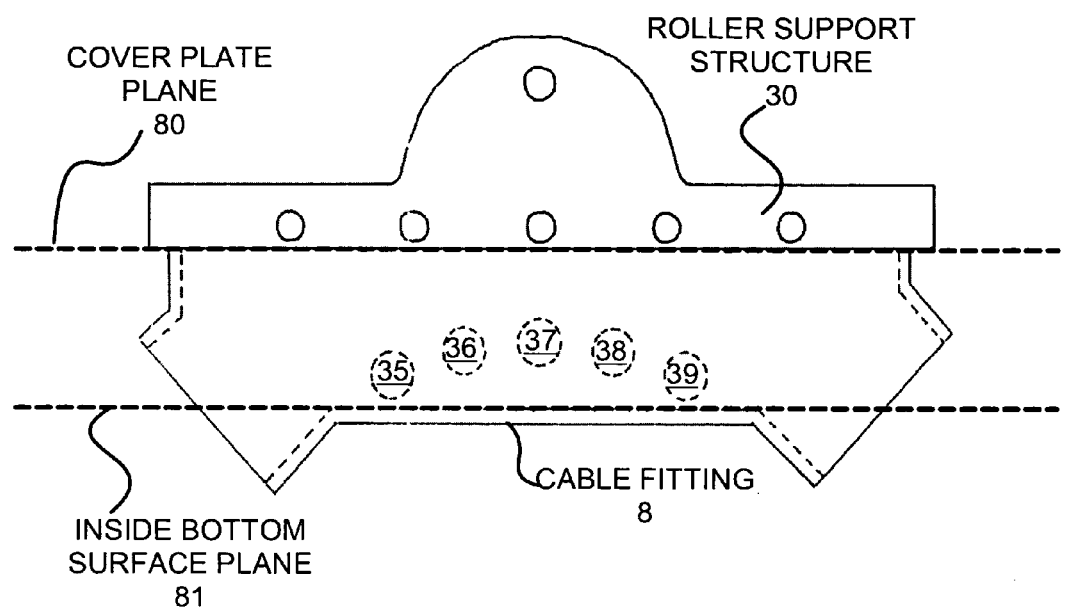
FIG. 9 is a cross sectional side view of a roller support structure 30 mounted on a cable fitting.

FIG. 8 shows the roller support structure 30 mounted to the cable fitting 8 at the location of cover plate plane 80 of FIG. 9. First spacer 50 is inserted between the cable fitting 8 and the roller support structure. Second spacer 51 is inserted between the roller support structure 30 and the cable fitting 8 at a location opposite first spacer 51. The roller support structure 30 is designed such that the attachment holes 57 and 58 of first spacer 50 are aligned with both attachment holes 43 and 44 of the roller support structure 30 and cover plate retaining holes 21 and 23 of the cable fitting 8. Similarly, the attachment holes 59 and 60 of first spacer 50 are aligned with both attachment holes 41 and 42 of the roller support structure 30 and cover plate retaining holes 22 and 24 of the cable fitting 8. The alignment of the attachment holes 41-44 of the roller support structure 30, attachment holes 57 and 58 of the first spacer 50 and attachment holes 59 and 60 of second spacer 51 with the cover plate retaining holes 21-24 of the cable fitting 8 facilitate mounting and unmounting of the roller support structure 30 from the cable fitting 8.

FIG. 9 is a cross sectional side view of the roller support structure 30 mounted on a cable fitting 8. The bearing surface of the roller support structure is mounted upon a cover plate mating surface of the cable fitting 8 which is disposed within a cover plate plane 80. Opposite the cover plate plane of the cable fitting 8 is an inside bottom surface plane 81 in which an inside bottom surface of cable fitting 8 is disposed. The location of the plurality of rollers 35-39 are shown disposed within the interior volume 27 of cable fitting 8 between the cover plate plane 80 of cable fitting 8 and the inside bottom surface plane 81.

Figure 7:
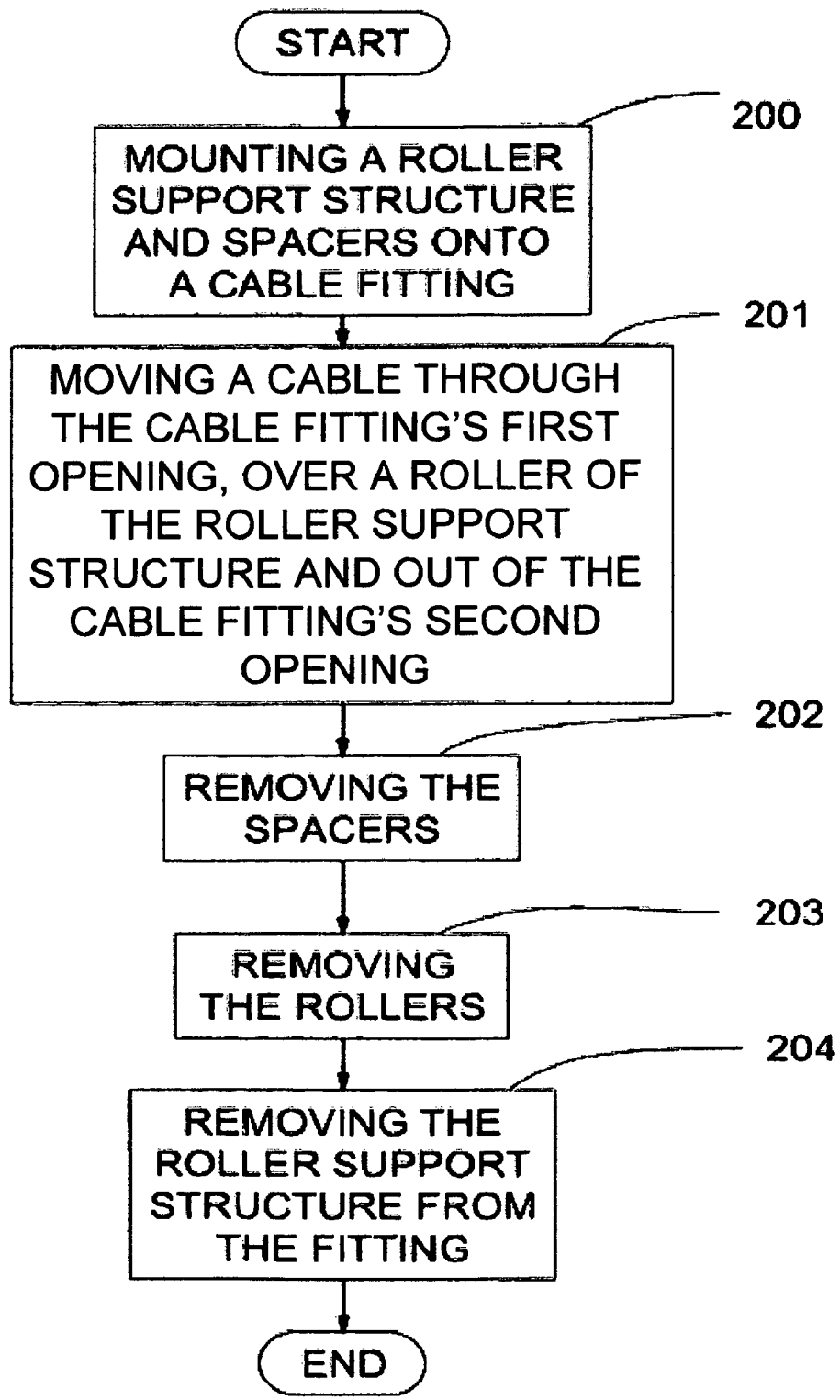
FIG. 7 is a flowchart of a novel method of using a roller support structure to move cable through a cable fitting.

FIG. 7 is a simplified flowchart diagram of a novel method in accordance with one embodiment. In the initial step 200, the roller support structure 30 is mounted to cable fitting 8. FIG. 8 shows the roller support structure 30 mounted to a cable fitting 8. In this figure, the side plates and rollers are disposed within the internal volume of cable fitting 8. First spacer 50 and second spacer 51 are positioned between the roller support structure 30 and the cable fitting 8. Attachment holes 41-44 are placed on the roller support structure 30 and attachment holes are also placed on spacers 50-51 such that they are in alignment with commercially available cable fittings such as a Crouse Hinds, Appleton and O-Z/Gedney cable fittings.

Next, in step 201, a cable 20 is moved through the first opening 25 of the cable fitting 8 over the rollers 35-39 of roller support device 30, then out of the second opening 26 of the cable fitting 8. This moving may entail first pulling a high tension pulling rope through the conduit, over the rollers, and through the cable fitting 8, to the location to where the cable 20 is fed into the conduit. An end of cable 20 is attached to the high tension pulling rope with a swivel, and the high tension pulling rope is pulled back through the conduit and cable fitting 8 thereby moving the cable 20 through the cable fitting 8.

Figure 10:
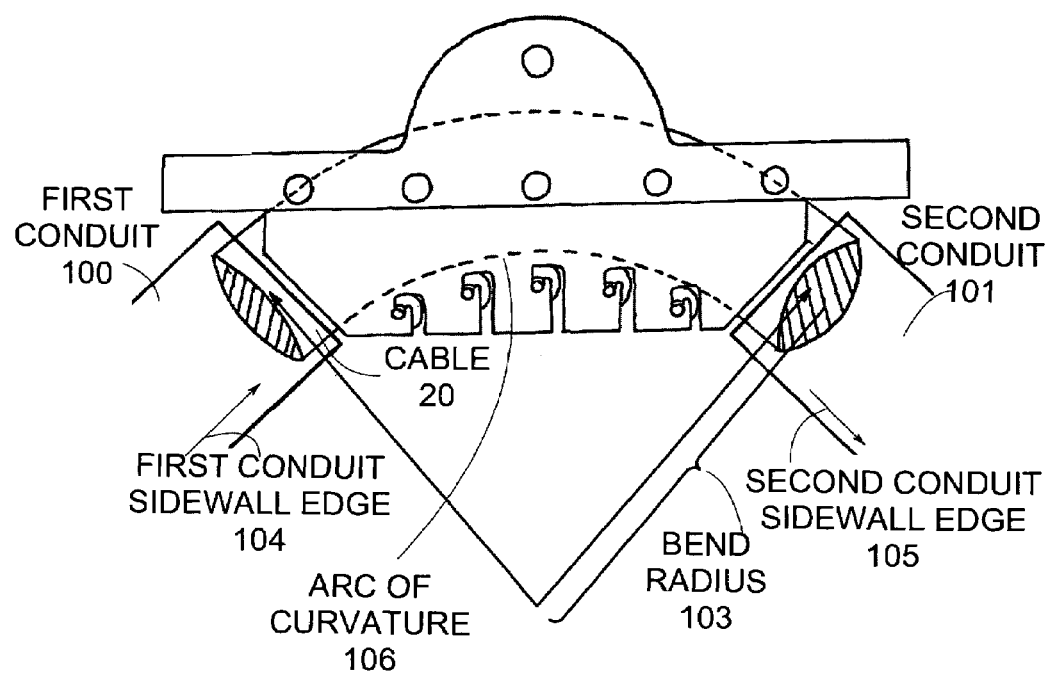
FIG. 10 is a diagram showing a cable being moved through the roller support device.

FIG. 10 shows a cable 20 being drawn out of a first conduit 100 through first opening 25 of cable fitting 8, over rollers 35-39 of the roller support structure 30, and then into second conduit 101. The rollers are positioned such that a minimum bend radius 103 is maintained as the cable moves from the first conduit 100, through the cable fitting 8 along an arc of curvature 106, and then into second conduit 101. This is to prevent damage to the cable and is especially useful when pulling delicate cables, such as when fiber-optic or similar cables are pulled through cable fittings. The roller support structure 30 and side plates 32 and 33 are designed such that they have smooth edges that will not allow damage to insulation of cable 20 as it is being pulled through the cable fitting 8 and roller support structure 30.

In a third step 202, first and second spacers 50 and 51 are removed to facilitate removal of the rollers.

Figure 11:
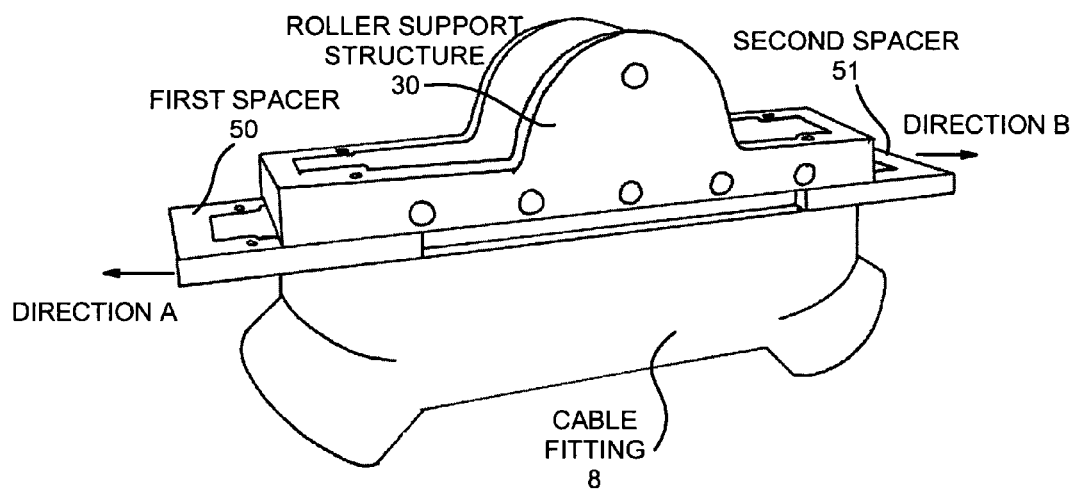
FIG. 11 is a diagram of a roller support device, spacers and a cable fitting.

FIG. 11 shows removal of the spacers by pulling the first spacer 50 in direction "A" and second spacer 51 in direction "B". First spacer 50 and second spacer 51 are shown between roller support structure 30 and cable fitting 8. First spacer 50 is shown partially extending outwards in direction A from roller support structure 30 and cable fitting 8. Second spacer 51 is shown partially extending outwards in direction B from roller support structure 30 and cable fitting 8. After the cable 20 has been fully moved through cable fitting 8, the first spacer 50 and second spacer 51 can be fully removed from between cable fitting 8 and roller support structure 30 by further extending them outwards in direction A and direction B respectively. By removing both first spacer 50 and second spacer 51 from in between the roller support structure 30 and cable fitting 8, the roller support structure can be lowered allowing the plurality of rollers 35-39 to be removed by sliding the roller axles 70 up, over and down through the "J" shaped channels and out into the interior volume 27 of the cable fitting 8.

Figure 12:
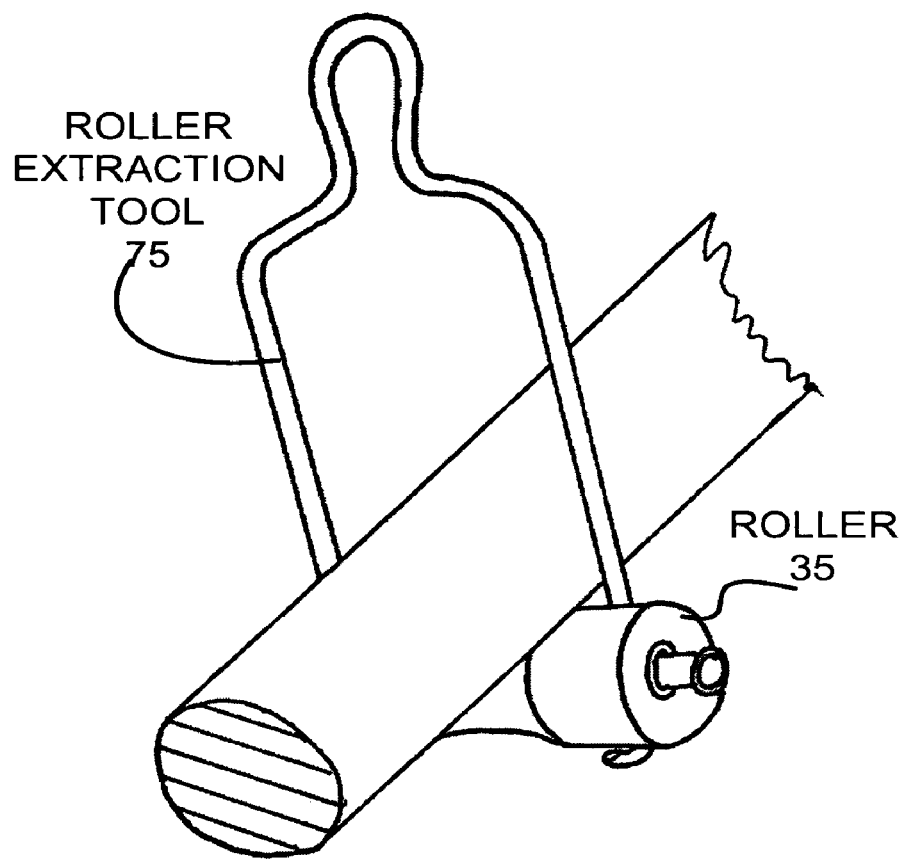
FIG. 12 is a diagram showing a roller extraction tool, a roller and a cable.

In the fourth step, 203, rollers 35-39 are removed by the roller extraction tool 75. The roller extraction tool 75 of FIG. 12 is used to lift the rollers up and out of "J" shaped roller channels 45-49. The rollers 35-39 then fall to the space between the space underneath the cable and inside bottom surface of the cable fitting and fall into the cable fitting. In a fifth step, 204, the roller support structure 30 is removed from cable fitting 8.

FIG. 12 shows roller extraction tool 75, cable 20 and roller 35. The roller extraction tool is designed such that it can extract roller 35 up over and down through the "J" shaped channel 45 once the spacers have been removed. After the roller is detached the roller will remain in the interior volume 27 of the cable fitting disposed between the cable 20 and the inside bottom surface of cable fitting 8. The roller extraction tool 75 is first used to detach roller 35 from between first and second side plates 32 and 33 by lifting the roller and sliding it out of "J" shaped channel 45. Roller extraction tool 75 may then be used to extract roller 35 from the interior volume 27 of cable fitting 8 by slipping roller 35 from between the cable and the interior sidewalls of the cable fitting.

Figure 13:
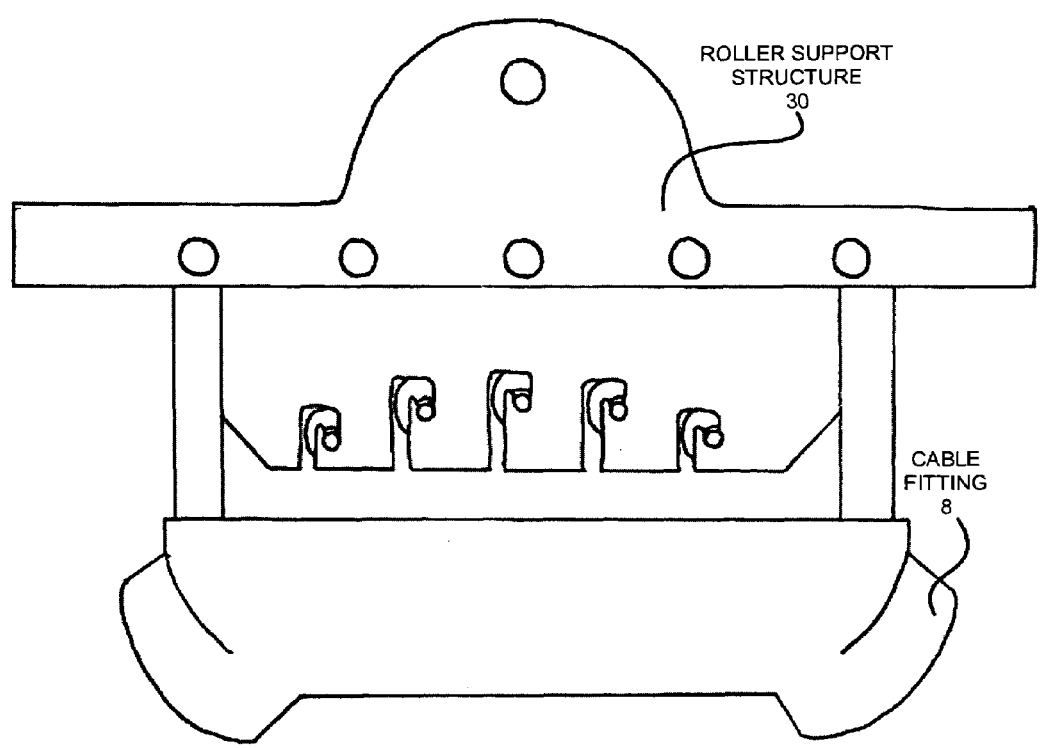
FIG. 13 is another diagram of a roller support device attached to a cable fitting.

FIG. 13 is another embodiment in accordance with the invention. In this embodiment the bearing surface of roller support structure 30 is mounted to the cover plate mating surface of cable fitting 8. First side plate 32 and second side plate 33 and plurality of rollers 35-39 are disposed outside of the interior volume of cable fitting 8.

In a second embodiment, a novel cable fitting includes a plurality of rollers that are part of the cable fitting. The rollers may, for example, be disposed along the inside bottom surface of the cable fitting. In one example, a ninety degree cable fitting for electrical conduit (the overall dimensions of the cable fitting are similar to a Crouse Hinds BUB or Appleton UB fitting, but the novel cable fitting is about one half inch wider) is provided. From five to twelve rollers are held captive and non-removable within the interior volume of a cast steel or aluminum conduit body. The rollers are placed and/or positioned in such a fashion as to allow the cable to be pulled out one end of the conduit and through the fitting, passing over the series of captive rollers, and into the other connecting conduit, all the while maintaining a radius that meets six hundred volt and fiber optic cable manufacturers' recommendations. These rollers have a concave-shaped channel to cause the cable to run toward the center of the rollers when pulled. Each roller has a steel axle with brass bushings.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
mounting a roller support structure on a cable fitting, the cable fitting having a first opening, a second opening, and a planar cover plate mating surface; and
moving a cable through the first opening into the cable fitting, over a roller of the roller support structure, and out of the cable fitting through the second opening.

2. The method of claim 1, wherein said moving of the cable involves sliding the cable through the cable fitting.

3. The method of claim 1, wherein the roller support structure is mounted to the cable fitting without the roller support structure being fixed to the cable fitting.

4. The method of claim 1, wherein the cable fitting defines an interior volume, the roller being disposed in the volume.

5. The method of claim 1, wherein said mounting involves providing a spacer between the roller support structure and the fitting and the method further comprising removing the spacers from between the roller support structure and the cable fitting after said moving when the cable is disposed in the cable fitting.

6. The method of claim 1, further comprising:
detaching the roller from the roller support structure after said moving, the roller being detached when the cable is disposed in the cable fitting.

7. The method of claim 1, wherein the roller support structure comprises a plurality of rollers.

8. The method of claim 1, wherein the first opening has a cross sectional area of at least three inches.

9. The method of claim 1, wherein the roller support structure comprises an anchor connection member, the method further comprising:
coupling the anchor connection member to an anchor, wherein the anchor pulls on the roller support structure when the cable is moved through the fitting thereby relieving pressure on fitting.

10. The method of claim 1, wherein the cable is simultaneously moved through a second cable fitting, wherein a second roller support structure is mounted on said second cable fitting.

11. The method of claim 1, wherein said cable has a diameter of at least two hundred square millimeters.

12. The method of claim 1, further comprising: unmounting the roller support structure from the cable fitting after said moving.

13. The method of claim 1, wherein the interior volume of the cable fitting is defined by an inside bottom surface, the inside bottom surface being disposed in an inside bottom surface plane, wherein the cable fitting has a cover plate mating surface being disposed in a cover plate plane, the roller is disposed between said inside bottom surface plane and said cover plate plane, wherein the roller is disposed between the cable and the inside bottom surface plane during said moving of the cable through the cable fitting.

14. The method of claim 13, wherein there is a second roller disposed between said inside bottom surface plane and said cover plate plane, wherein the rollers are disposed between the cable and the inside bottom surface plane during said moving of the cable through the cable fitting.

15. The method of claim 1, wherein the interior volume of the cable fitting is defined by an inside bottom surface, the inside bottom surface being disposed in an inside bottom surface plane, wherein the roller is disposed between said inside bottom surface plane and said cable during said moving of the cable through the cable fitting.

16. A device comprising:
a roller support structure having a planar bearing surface, the roller support structure comprising a first side plate and a second side plate; and
a plurality of rollers, each of the rollers having a first end portion supported by the first side plate and a second end portion supported by the second side plate.

17. A device comprising:
a roller support structure having a planar bearing surface, the roller support structure comprising a first side plate and a second side plate; and
at least three rollers, each of the rollers having a first end portion supported by the first side plate and a second end portion supported by the second side plate.

18. The device of claim 17, additionally comprising an anchor connection member.

19. A device comprising:
a roller; and
means for pulling a cable through a first opening in a cable fitting over the roller and out of the cable fitting through a second opening of the cable fitting, wherein the means has a planar bearing surface.

20. The device of claim 19, wherein the cable fitting defines an interior volume and the roller is disposed outside of the interior volume.

21. A roller support structure comprising:
a frame having a rectangular edge, the edge having a width;
a first side plate that extends from the frame, wherein the first side plate has a first side surface and a second side surface, wherein the first side plate is nonmoveable with respect to the frame;
a second side plate that extends from the frame, wherein the second side plate has a first side surface and a second side surface, wherein the second side plate is nonmoveable with respect to the frame, wherein a distance from the first side surface of the first side plate, through the first side plate, to the second side surface of the second side plate, through the second side plate, and to the first side surface of the first side plate is smaller than the width of the frame; and
a roller that is supported by the first and second side plates, wherein the roller is rotatable about an axis, wherein a line colinear with the axis does not extend through any part of the frame.

22. The roller support structure of claim 21, wherein the frame has a length, the length of the frame being greater than the width of the frame.

23. The roller support structure of claim 21, wherein the roller support structure includes a plurality of rollers that is supported by the first and second side plates, wherein intersections of axes of the plurality of rollers and the first side plate scribe an arc, wherein the arc is less than a half circle.

24. The roller support structure of claim 21, wherein the first side plate has a J-shaped roller support channel, and wherein the second side plate has a J-shaped roller support channel.

* * * * *